US012035304B2

(12) United States Patent
Miao

(10) Patent No.: US 12,035,304 B2
(45) Date of Patent: *Jul. 9, 2024

(54) METHODS FOR NETWORK ASSISTED BEAMFORMING FOR SIDELINK UNICAST COMMUNICATION

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,106

(22) Filed: Jan. 12, 2023

(65) Prior Publication Data

US 2023/0224892 A1 Jul. 13, 2023

Related U.S. Application Data

(63) Continuation of application No. 17/268,508, filed as application No. PCT/US2019/048454 on Aug. 28, 2019, now Pat. No. 11,589,371.

(Continued)

(51) Int. Cl.
*H04W 72/1263* (2023.01)
*H04B 17/318* (2015.01)
(Continued)

(52) U.S. Cl.
CPC ...... *H04W 72/1263* (2013.01); *H04B 17/318* (2015.01); *H04L 5/0051* (2013.01);
(Continued)

(58) Field of Classification Search
CPC ............. H04W 72/1263; H04W 24/10; H04W 72/046; H04W 72/535; H04W 92/18; H04B 17/318; H04L 5/0051; H04L 25/0226
See application file for complete search history.

(56) References Cited

U.S. PATENT DOCUMENTS 10,499,375 B2 12/2019 Jung et al.
2014/0274196 A1 9/2014 Dai et al.
(Continued)

FOREIGN PATENT DOCUMENTS

EP 2770786 A4 8/2014
EP 3216296 A1 9/2017
(Continued)

OTHER PUBLICATIONS

International Search Report dated Dec. 12, 2019 for International Application No. sPCT/US2019/048454.

(Continued)

*Primary Examiner* — Deepa Belur
(74) *Attorney, Agent, or Firm* — Eschweiler & Potashnik, LLC

(57) ABSTRACT

An apparatus configured to be employed in a gNodeB associated with a new radio (NR) system is disclosed. The apparatus comprises one or more processors configured to configure one or more sidelink sounding reference signals (SRS), for one or more user equipments (UEs) associated with the gNodeB, to be utilized by the one or more UEs for transmission or reception, or both, over sidelink. The one or more processors is further configured to generate one or more sidelink SRS configuration signals to be provided, respectively, to the one or more UEs, wherein each sidelink SRS configuration signal comprises sidelink SRS configuration information on the one or more sidelink SRS configured for a respective UE. The apparatus further comprises a radio frequency (RF) interface, configured to provide, to a radio frequency (RF) circuitry, the one or more sidelink SRS configuration signals, for subsequent transmission to the one or more UEs, respectively.

20 Claims, 2 Drawing Sheets

Related U.S. Application Data

(60) Provisional application No. 62/723,709, filed on Aug. 28, 2018.

(51) Int. Cl.
   *H04L 5/00* (2006.01)
   *H04L 25/02* (2006.01)
   *H04W 24/10* (2009.01)
   *H04W 72/044* (2023.01)
   *H04W 72/50* (2023.01)
   *H04W 92/18* (2009.01)

(52) U.S. Cl.
   CPC ......... *H04L 25/0226* (2013.01); *H04W 24/10* (2013.01); *H04W 72/046* (2013.01); *H04W 72/535* (2023.01); *H04W 92/18* (2013.01)

(56) References Cited

U.S. PATENT DOCUMENTS

| | | | |
|---|---|---|---|
| 2017/0048039 A1 | 2/2017 | Zhao et al. | |
| 2018/0263019 A1 | 9/2018 | Jung et al. | |
| 2019/0372647 A1 | 12/2019 | Su et al. | |
| 2020/0267025 A1* | 8/2020 | Yu | H04L 5/0051 |
| 2021/0037503 A1* | 2/2021 | Nam | H04W 72/0446 |
| 2021/0050888 A1* | 2/2021 | Manolakos | H04L 5/0023 |
| 2021/0219169 A1* | 7/2021 | Ji | H04W 28/0278 |
| 2021/0219268 A1* | 7/2021 | Li | H04W 72/20 |
| 2021/0282099 A1 | 9/2021 | Osawa | |
| 2021/0314974 A1* | 10/2021 | Miao | H04W 72/046 |
| 2021/0329598 A1 | 10/2021 | Wang | |
| 2022/0053538 A1 | 2/2022 | Akkarakaran | |
| 2023/0119853 A1* | 4/2023 | Wang | H04W 72/20 370/329 |

FOREIGN PATENT DOCUMENTS

| | | | |
|---|---|---|---|
| WO | 2017/185201 A1 | 2/2017 | |
| WO | 2017/171390 A1 | 5/2017 | |
| WO | 2015126843 A1 | 5/2017 | |
| WO | 2017027055 A1 | 3/2018 | |
| WO | 2018079969 A1 | 3/2018 | |
| WO | 2018/128376 A1 | 7/2018 | |
| WO | 2018/151554 A1 | 8/2018 | |
| WO | 2017142574 A1 | 8/2018 | |
| WO | 2020047024 | 5/2020 | |

OTHER PUBLICATIONS

"5G/NR—Beam Management. RF Components for the Next Generation." https://www.sharetechnote.com/html/5G/5G_Phy_BeamManagement.html/. Printed on Feb. 10, 2021.

"Structural health monitoring using inclinometer with machine learning." St life.augmented. STMicroelectronics. https://www.st.com/en/applications/telematics-and-networking/vehicle-to-everything-v2x.html. Printed on Feb. 10, 2021.

"Vehicle-to-everything." Wikipedia. https://en.wikipedia.org/wiki/Vehicle-to-everything.

"What is LTE Sidelink." https://www.everythingrf.com/community/what-is-lte-sidelink. Jun. 11, 2018.

Molina-Masegosa, Rafael et al. "LTE-V for Sidelink 5G V2X Vehicular Communications: A New 5G Technology for Short-Range Vehicle-to-Everything Communications." Feb. 6, 2018. https://vtsociety.org/2018/02/vehicles-february-2018/.

International Preliminary Report on Patentability dated Mar. 2, 2021 for International Application No. PCT/US2019/048454.

Vodafone; "New SID:Study on NR V2X"; 3GPP TSG RAN Meeting #80; La Jolla, USA; Jun. 11-14, 2018.

STMicroelectronics; "Vehicle-to-Everything (V2X)"; 1. https://www.st.com/en/applications/telematics-and-networking/vehicle-to-everything-v2x.html#overview.

Notice of Allowance dated Oct. 13, 2022 in connection with U.S. Appl. No. 17/268,508.

Non-Final Office Action dated Jul. 14, 2022 in connection with U.S. Appl. No. 17/268,508.

NTT Docomo, Inc.; "Work plan for Rel-15 NR WI"; 3GPP TSG RAN WG1 Meeting #90bis; R1-1718177; Oct. 9, 2017.

* cited by examiner

METHODS FOR NETWORK ASSISTED BEAMFORMING FOR SIDELINK UNICAST COMMUNICATION

CROSS-REFERENCE TO RELATED APPLICATIONS

This application is a Continuation of application Ser. No. 17/268,508 filed Feb. 15, 2021, which is a National Phase entry application of International Patent Application No. PCT/US2019/048454 filed Aug. 28, 2019, which claims the benefit of U.S. Provisional Application No. 62/723,709, filed Aug. 28, 2018, entitled "NETWORK ASSISTED BEAMFORMING FOR SIDELINK UNICAST COMMUNICATION", the contents of which are herein incorporated by reference in their entirety.

FIELD

The present disclosure relates to new radio (NR) systems, and in particular, to a system and a method for network assisted beamforming for sidelink unicast communication in new radio (NR) Vehicle-to-everything (V2X) systems.

BACKGROUND

Vehicle-to-everything (V2X), referring to Vehicle-to-vehicle (V2V) and vehicle-to-Infrastructure (V2I) communications, is a wireless technology aimed at enabling data exchanges between a vehicle and its surroundings. New radio (NR) vehicle-to-everything V2X aims to support unicast, groupcast and broadcast communication over the sidelink. In some embodiments, the sidelink refers to a communication mechanism between 2 devices (e.g., two V2X UEs) without going through a base station (e.g., eNodeB, gNodeB etc.). In NR Uu interface (i.e., a radio interface between a user equipment (UE) and a gNodeB), large level of flexibility and scalability are very crucial to fulfill the requirements of diverse 5G use cases. And the flexibility and scalability are inherent to numerous design aspects including the modulation schemes, frame structure, reference signals, and multi-antenna transmission etc. Similarly, it is advantageous that the NR sidelink design can reuse the NR Uu physical layer design principles in regard to flexibility and scalability, e.g., by virtue of configurable numerology, frame structure and reference signals etc. so as to support diverse use cases with extreme requirements, as well as a wide range of frequencies and deployment options.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
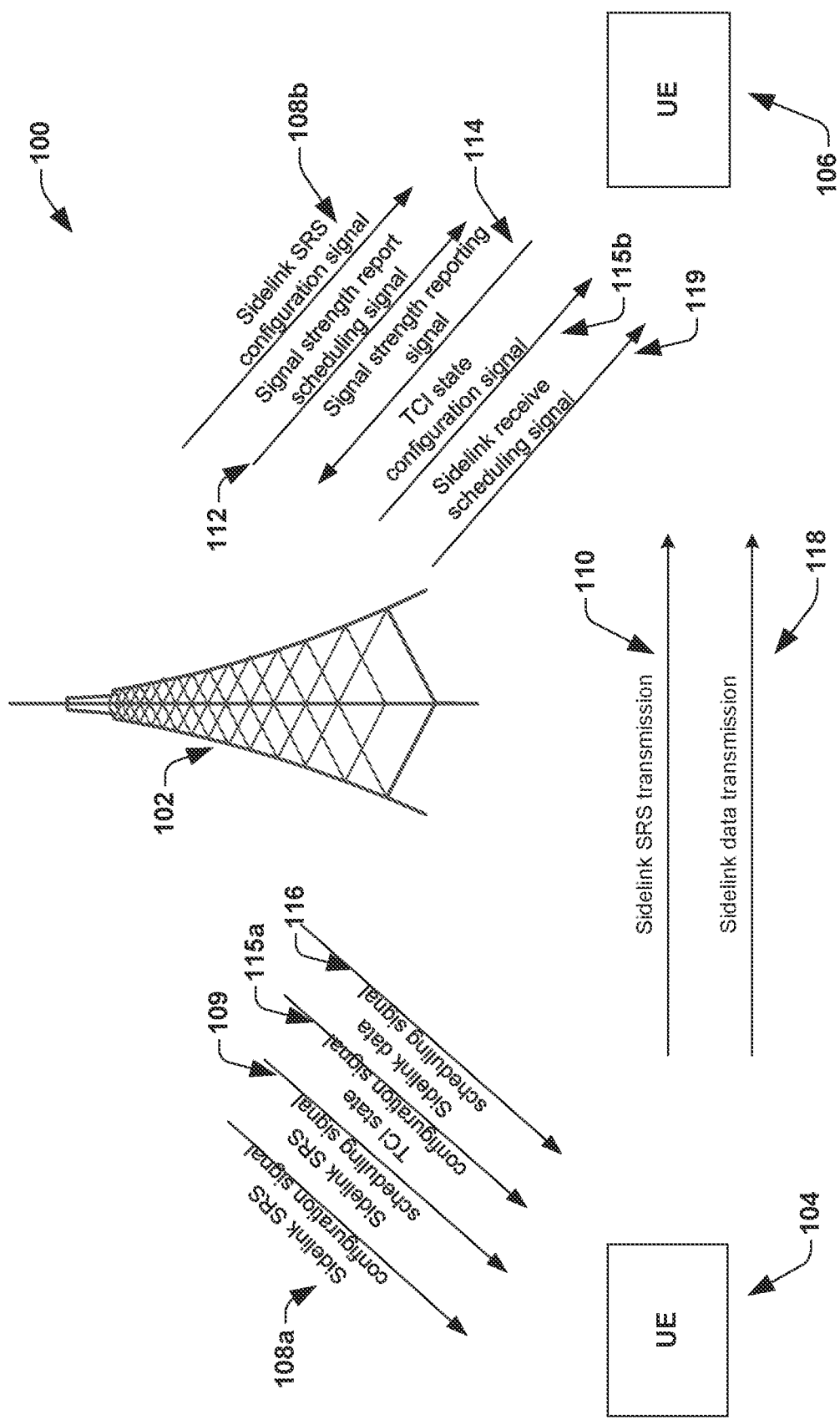
FIG. 1 illustrates a simplified block diagram of a new radio (NR) communication system, according to one embodiment of the disclosure.

In one embodiment of the disclosure, an apparatus configured to be employed in a gNodeB associated with a new radio (NR) system is disclosed. The apparatus comprises one or more processors configured to configure one or more sidelink sounding reference signals (SRS), for one or more user equipments (UEs) associated with the gNodeB, to be utilized by the one or more UEs for transmission or reception, or both, over sidelink. The one or more processors is further configured to generate one or more sidelink SRS configuration signals to be provided, respectively, to the one or more UEs. In some embodiments, each sidelink SRS configuration signal comprises sidelink SRS configuration information on the one or more sidelink SRS configured for a respective UE. In some embodiments the apparatus further comprises a radio frequency (RF) interface, configured to provide, to a radio frequency (RF) circuitry, the one or more sidelink SRS configuration signals, for subsequent transmission to the one or more UEs, respectively.

In one embodiment of the disclosure, an apparatus configured to be employed in a user equipment (UE) associated with a new radio (NR) system is disclosed. The apparatus comprises one or more processors configured to process a sidelink sounding reference signal (SRS) configuration signal, received from a gNodeB associated therewith, wherein the sidelink SRS configuration signal comprises sidelink SRS configuration information on one or more sidelink SRS configured for the UE for transmission or reception, or both, over sidelink. In some embodiments, the one or more processors is further configured to determine the one or more sidelink SRS configured for the UE, based on processing the sidelink SRS configuration signal.

In one embodiment of the disclosure, a computer readable storage device storing executable instructions that, in response to execution, cause one or more processors of a gNodeB to perform operations, is disclosed. In some embodiments, the operations comprise configuring one or more sidelink sounding reference signals (SRS), for one or more user equipments (UEs) associated with the gNodeB, to be utilized by the one or more UEs for transmission or reception, or both, over sidelink. In some embodiments, the operations further comprise generating one or more sidelink SRS configuration signals to be provided, respectively, to the one or more UEs. In some embodiments, each sidelink SRS configuration signal comprises sidelink SRS configuration information on the one or more sidelink SRS configured for a respective UE. In some embodiments, the operations further comprise providing the one or more sidelink SRS configuration signals to a radio frequency (RF) circuitry, for subsequent transmission to the one or more UEs, respectively.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, it is advantageous that the NR sidelink design can reuse the NR Uu physical layer design principles in regard to flexibility and scalability, e.g., by virtue of configurable numerology, frame structure and reference signals etc. so as to support diverse use cases with extreme requirements, as well as a wide range of frequencies and deployment options. In the embodiments described throughout the disclosure, the terms sidelink, NR sidelink, sidelink communication etc. refers to a communication mechanism between two or more devices (e.g., two V2X UEs) without going through a base station (e.g., eNodeB, gNodeB etc.). Similar to long term evolution (LTE) V2X, NR V2X shall also consider both in-network coverage and out-of-network coverage scenarios. In case of in-network coverage scenario, the radio resource for sidelink communication can be optimally allocated/managed by gNodeB so that the respective QoS can be better controlled especially for the unicast sidelink communication. Multi-antenna techniques have been advanced significantly in LTE and further unified into a generalized framework in NR. It is envisioned the supported beamforming and advanced MIMO transmission are very important to enhance the communication reliability and/or data rate for NR cellular link communication. It is natural that advanced beamforming/MIMO can be also extended for NR sidelink communication. This is particularly interest for the unicast sidelink communication where it can be more practical to assume the availability of sidelink channel state information at the sidelink devices.

For new radio (NR) V2X UEs in the coverage of network, the V2X UEs can be configured to perform the sidelink communication by using the radio resource scheduled by a gNodeB associated therewith. To apply proper beamforming transmission for sidelink unicast communication (i.e., between 2 UEs), sidelink beam management procedure to achieve beam alignment need to be performed. In case of in-network coverage case, the sidelink beam management can be conducted under the full control of gNodeB. In some embodiments, the gNodeB is configured to perform sidelink beam management based on the availability of a channel state information (CSI) associated with the sidelink (e.g., between 2 sidelink V2X UEs) at the gNodeB. In some embodiments, the sidelink beam management at the sidelink and the determination of the CSI associated with the sidelink is performed by the gNodeB based on configuring one or more reference signals (e.g., sounding reference signals (SRS)) for the V2X UEs for sidelink. Therefore, a gNodeB configured to configure sidelink sounding reference signals (SRS) for one or more V2X UEs associated with the gNodeB is proposed in the disclosure. In the embodiments described throughout the disclosure, the sidelink SRS may be further referred to as sidelink SRS resources, and both the sidelink SRS and the sidelink SRS resource are construed to mean the same. Further, a method to determine CSI associated with the sidelink (e.g., between two V2X UEs) at the gNodeB, based on the configured sidelink SRS is also proposed herein. In addition, a method to perform network assisted beam management for sidelink unicast transmission, based on the configured sidelink SRS is proposed in the disclosure.

FIG. 1 illustrates a simplified block diagram of a new radio (NR) communication system 100, according to one embodiment of the disclosure. In some embodiments, the NR communication system 100 facilitates network assisted beamforming for unicast sidelink communication. In some embodiments, unicast sidelink communication comprises a communication between two user equipments (UEs) over the sidelink. The NR communication system 100 comprises an gNodeB 102, a first user equipment (UE) 104 and a second UE 106. In other embodiments, however, the NR communication system 100 can comprise a plurality of UEs (more than two UEs) associated with the gNodeB 102, and is not shown here for clarity purposes. In some embodiments, the gNodeB 102 is equivalent to a base station, e.g., an eNodeB in LTE systems etc. In some embodiments, the first UE 104 and the second UE 106 may comprise a vehicle-to-everything (V2X) UE. However, in other embodiments, the first UE 104 and the second UE 106 may comprise a mobile phone, tablet computer, an internet of things (IoT) device etc. The first UE 104 and the second UE 106 are configured to communicate with the gNodeB 102 over a communication medium (e.g., air). Similarly, the first UE 104 and the second UE 106 are configured to communicate with one another over a communication medium (e.g., air).

In some embodiments, the first UE 104 may be configured to transmit data/reference signals to the second UE 106. Further, in some embodiments, the first UE 104 may be configured to receive data/reference signals from the second UE 106. Similarly, in some embodiments, the second UE 106 may be configured to transmit data/reference signals to the first UE 104. Further, in some embodiments, the second UE 106 may be configured to receive data/reference signals from the first UE 104. However, for clarity of explanation, in this embodiment, the first UE 104 is referred to as a transmit UE configured to transmit data/reference signals to the second UE 106. Further, the second UE 106 is referred to as a receive (Rx) UE 106 configured to receive data/reference signals from the first UE 104. However, in other embodiments, the first UE 104 may be defined as the Rx UE and the second UE may be defined as the Tx UE. In some embodiments, the Tx UE 104 and the Rx UE 106 are assumed to be in the coverage area of the gNodeB 102.

In order to facilitate network assisted beamforming (i.e., beamforming under the control of the gNodeB 102) for unicast sidelink communication between the Tx UE 104 and the Rx UE 106, in some embodiments, the gNodeB 102 is configured to configure one or more sidelink sounding reference signals (SRS) for the Tx UE 104 and the Rx UE 106). However, in other embodiments, the gNodeB 102 may be configured to configure one or more sidelink SRS signals for one or more UEs (e.g., more than 2 UEs) associated with the gNodeB 102. In some embodiments, the one or more sidelink SRS are utilized by the one or more UEs for transmission or reception, or both, over sidelink (e.g., for transmission or reception, or both between Tx UE 104 and the Rx UE 106). In some embodiments, the gNodeB 102 is configured to configure the one or more sidelink SRS for the one or more UEs from a predefined/preconfigured resource pool (e.g., a preconfigured V2X resource pool) comprising a plurality of time frequency resources.

In some embodiments, the gNodeB 102 is further configured to generate a first sidelink SRS configuration signal 108a and a second SRS configuration signal 108b, to be provided, respectively, to the Tx UE 104 and the Rx UE 106. In some embodiments, the first sidelink SRS configuration signal 108a comprises sidelink SRS configuration information on the one or more sidelink SRS configured for the Tx UE 104. Further, the second sidelink SRS configuration signal 108b comprises sidelink SRS configuration information on the one or more sidelink SRS configured for the Rx UE 106. In other embodiments, the gNodeB 102 may be configured to generate one or more sidelink SRS configuration signals (e.g., not limited to two as shown herein) to be provided, respectively, to one or more UEs associated with the gNodeB 102. In some embodiments, each sidelink SRS configuration signal of the one or more sidelink SRS configuration signals comprises sidelink SRS configuration information on the one or more sidelink SRS configured for a respective UE. In some embodiments, the gNodeB 102 is further configured to provide the one or more sidelink SRS configuration signals (i.e., the first SRS configuration signal 108a and the second SRS configuration signal 108b) to the one or more UEs (i.e., the Tx UE 104 and the Rx UE 106), respectively. In some embodiments, the gNodeB 102 is configured to provide the one or more sidelink SRS configuration signals to the one or more UEs, respectively, based on downlink radio resource configuration (RRC) signaling.

In some embodiments, the SRS configuration information on the one more sidelink SRS included within each of the sidelink SRS configuration signal (e.g., the first SRS configuration signal 108a or the second SRS configuration signal 108b) comprises one or more of a time-frequency resource parameter, an SRS type parameter, a sequence parameter, cyclic shift parameter, a periodicity parameter and an antenna port parameter. In some embodiments, the time frequency parameter comprises information on a number of symbols and resource blocks used for the one or more sidelink SRS, and location of these resource blocks. In some embodiments, the SRS type parameter comprises information on whether the one or more sidelink SRS is configured for transmission, reception or both transmission and reception. In some embodiments, the sequence parameter comprises information on a sequence associated with the one or more sidelink SRS. In some embodiments, the sequence may be UE-specific, e.g., initialized by UE-ID. However, in other embodiments, the sequence may be time-frequency resource-specific, e.g., being initialized by symbol and resource block index within the preconfigured resource pool. In some embodiments, the cyclic parameter comprises information on a cyclic shift for the SRS sequence associated with the one or more sidelink SRS. In some embodiments, the periodicity parameter defines a time interval between consecutive SRS transmissions for the one or more sidelink SRS in case of single scheduling based multiple SRS transmissions. In some embodiments, the antenna port parameter comprises information on one or more virtual antenna ports of the UE (e.g., Tx UE 104) that are respectively associated with the one or more sidelink SRS. In some embodiments, the virtual antenna ports can correspond to a certain TX/RX beam of the UE.

In some embodiments, the Tx UE 104 is configured to process the first sidelink SRS configuration signal 108a, received from the gNodeB 102. In some embodiments, the Tx UE 104 is further configured to determine the one or more sidelink SRS configured for the Tx UE 104, based on processing the sidelink SRS configuration signal 108a. Similarly, in some embodiments, the Rx UE 106 is configured to process the second sidelink SRS configuration signal 108b, received from a gNodeB 102. In some embodiments, the Rx UE 106 is further configured to determine the one or more sidelink SRS configured for the Rx UE 104, based on processing the sidelink SRS configuration signal 108b.

In order to facilitate the network assisted beamforming (i.e., beamforming under the control of the gNodeB 102) for unicast sidelink communication between the Tx UE 104 and the Rx UE 106, in some embodiments, the gNodeB 102 is further configured to determine a channel state information (CSI) between the Tx UE 104 and the Rx UE 106. In order to determine the CSI between the Tx UE 104 and the Rx UE 106, in some embodiments, gNodeB 102 is configured to generate a sidelink SRS scheduling signal 109 to be provided to the TX UE 104. In some embodiments, the sidelink SRS scheduling signal 109 is configured to schedule transmission of a configured sidelink SRS of the one or more configured SRS for the Tx UE 102, that forms a scheduled sidelink SRS transmission 110, from the Tx UE 104 to the Rx UE 106. In some embodiments, the gNodeB 102 is further configured to provide the sidelink SRS scheduling signal 109 to the Tx UE 104. In some embodiments, the scheduled sidelink SRS transmission 110 may include a number of repeated transmissions. In some embodiments, the transmission time interval between repetitions of the sidelink SRS is configured as part of sidelink SRS configuration signal 108a, e.g., defined by parameter periodicity, as explained above. However, in other embodiments, the transmission time interval between repetitions of the sidelink SRS is dynamically signaled as part of the sidelink SRS scheduling signal 109. In some embodiments, the sidelink SRS scheduling signal 109 comprises SRS scheduling information that provides an indication to schedule a configured sidelink SRS, an SRS transmission start time etc., among others.

In order to determine the CSI, in some embodiments, the gNodeB 102 is further configured to generate a signal strength report scheduling signal 112 to be provided to the Rx UE 106. In some embodiments, the signal strength report scheduling signal 112 comprises a request to the Rx UE 106 to schedule a measurement of a signal strength of the scheduled sidelink SRS transmission 110 from the Tx UE 104 and to report the measured signal strength, to the gNodeB 102. In particular, in some embodiments, the signal strength report scheduling signal 112 comprises the transmission resource allocation of the scheduled SRS transmission 110 including start time, repetition time interval, and measurement report time etc. In some embodiments, the gNodeB 102 is further configured to provide the signal strength report scheduling signal 112 to the Rx UE 106.

Upon receiving the sidelink SRS scheduling signal 109 from the gNodeB 102, the Tx UE 104 is configured to process the sidelink SRS scheduling signal 109. Upon processing the sidelink SRS scheduling signal 109, the Tx UE 104 is further configured to provide the scheduled sidelink SRS transmission 110 to the Rx UE 106 over sidelink. In some embodiments, the Rx UE 106 is further configured to process the signal strength report scheduling signal 112, received from the gNodeB 102. In some embodiments, the Rx UE 106 is further configured to process the scheduled sidelink SRS transmission 110 from the Tx UE 104. Upon processing the scheduled sidelink SRS transmission 110, the Rx UE 106 is further configured to measure the signal strength associated with the scheduled sidelink SRS transmission 110 from the Tx UE 104, in response to the request included within the signal strength report scheduling signal 112. Upon measuring the signal strength associated with the scheduled sidelink SRS transmission 110, the Rx UE 106 is further configured to generate a signal strength reporting signal 114, to be provided to the gNodeB 102. In some embodiments, the signal strength reporting signal 114 comprises information on the measured signal strength associated with the scheduled sidelink SRS transmission 110 from the Tx UE 104 at the Rx UE 106. In some embodiments, the Rx UE 106 is further configured to provide the signal strength reporting signal 114 to the gNodeB 102. In some embodiments, the Rx UE 106 is configured to generate and provide the signal strength reporting signal 114 to the gNodeB 102, in response to the signal strength report scheduling signal 112 received from the gNodeB 102. In some embodiments, the measured signal strength comprises a reference signal receive power (RSRP) associated with the scheduled sidelink SRS transmission 110. However, other parameters to measure the signal strength associated with the scheduled sidelink SRS transmission 110 may be utilized in other embodiments.

Upon receiving the signal strength reporting signal 114 from the Rx UE 106, the gNodeB 102 is configured to determine the measured signal strength associated with the scheduled sidelink SRS transmission 110 at the Rx UE 106, based on processing the signal strength reporting signal 114. In some embodiments, the scheduled sidelink SRS transmission 110 comprises a plurality of scheduled sidelink SRS transmissions. In other words, the gNodeB 102 may be configured to schedule a plurality of sidelink SRS transmissions between the Tx UE 104 and the Rx UE 106. In some embodiments, each scheduled sidelink SRS transmission of the plurality of scheduled SRS transmissions between the Tx UE 104 and the Rx UE 106 is associated with a particular configured sidelink SRS of the one or more configured SRS for the Tx UE 104. In such embodiments, the sidelink SRS scheduling signal 109 comprises a plurality of sidelink SRS scheduling signals respectively associated with the plurality of sidelink SRS transmissions. In such embodiments, the signal strength reporting signal 114 may comprise a plurality of signal strength reporting signals respectively associated with the plurality of the scheduled sidelink SRS transmissions from the Tx UE 104. In some embodiments, each configured SRS for the Tx UE 104 is associated with a particular Tx beam associated with the Tx UE 104. Therefore, in such embodiments, the measured signal strength associated with the scheduled sidelink SRS transmission 110 comprised within the signal strength reporting signal 114 is indicative of a signal strength associated with a respective Tx beam associated with the Tx UE 104. In some embodiments, determining the signal strength associated with the plurality of scheduled sidelink SRS transmissions enables the gNodeB 102 to determine a relative signal strength for different transmit beams associated with the Tx UE 104 at the Rx UE 106.

In order to facilitate the network assisted beamforming, in some embodiments, the gNodeB 102 is further configured to configure a set of sidelink transmit configuration indicator (TCI) states for a set of UEs of the one or more UEs associated with the gNodeB 102. In some embodiments, the set of sidelink TCI states is respectively associated with a set of configured sidelink SRS for a respective UE. In some embodiments, each sidelink TCI state of the set of sidelink TCI states is indicative of a transmit/receive beam associated with the respective configured sidelink SRS. For example, in this embodiment, the gNodeB 102 is configured to configure a set of sidelink TCI states for the Tx UE 104 and a set of sidelink TCI states for the Rx UE 106. In some embodiments, the set of sidelink TCI states are configured for each UE based on a transmission direction associated with the corresponding UE. For example, for the Tx UE 104, the set of TCI states are respectively associated with a set of sidelink SRS configured for transmission (in turn indicative of a set of transmit beams, respectively associated with the Tx UE 104). Similarly, for the Rx UE 106, the set of TCI states are respectively associated with a set of sidelink SRS configured for reception (in turn indicative of a set of receive beams, respectively associated with the Rx UE 106).

Further, in some embodiments, for unicast transmission between a Tx-Rx UE pair (e.g., the Tx UE 104 and the Rx UE 106), the set of sidelink TCI states configured for the Tx UE (e.g., the Tx UE 104) and the set of sidelink TCI states configured for the Rx UE (e.g., the Rx UE 106) are the same, for one transmission direction between the Tx UE and the Rx UE. In such embodiments, each sidelink TCI state of the set of sidelink TCI states is indicative of a Tx beam associated with the Tx UE 104 and an Rx beam associated with the Rx UE 106. In some embodiments, the gNodeB 102 is further configured to generate a set of TCI state configuration signals to be provided to the set of UEs, respectively. In some embodiments, each TCI state configuration signal comprises TCI configuration information on the set of sidelink TCI states configured for a respective UE of the set of UEs. In some embodiments, the gNodeB 102 is further configured to provide the set of TCI state configuration signals to the set of UEs, respectively. For example, in this embodiment, the gNodeB 102 is configured to generate a first TCI state configuration signal 115a comprising TCI configuration information on the set of sidelink TCI states configured for the Tx UE 104. Further, the gNodeB 102 is configured to generate a second TCI state configuration signal 115b comprising TCI configuration information on the set of sidelink TCI states configured for the Rx UE 106. Further, the gNodeB 102 is configured to provide the first TCI state configuration signal 115a and the second TCI state configuration signal 115b to the Tx UE 104 and the Rx UE 106, respectively. In some embodiments, the Tx UE 104 is configured to process the first TCI configuration signal 115a, in order to determine the set of sidelink TCI states configured for the Tx UE 104. Similarly, the Rx UE 106 is configured to process the second TCI configuration signal 115b, in order to determine the set of sidelink TCI states configured for the Rx UE 106.

To schedule sidelink unicast data transmission between the Tx UE 10 and the Rx UE 106, in some embodiments, the gNodeB 102 is further configured to generate a sidelink data scheduling signal 116 to be provided to the Tx UE 104. In some embodiments, the sidelink data scheduling signal 116 comprises data scheduling information indicative of a resource allocation, modulation data scheme (MCS) etc. for a scheduled sidelink data transmission. In some embodiments, the sidelink data scheduling signal 116 further comprises a sidelink TCI state of the set of sidelink TCI states configured for the Tx UE 104. In some embodiments, the sidelink TCI state included within the sidelink data scheduling signal 116 is indicative of a transmit beam to be utilized by the Tx UE 104 for the sidelink data transmission. In some embodiments, including the sidelink TCI state within the sidelink data scheduling signal 116 facilitates network assisted beamforming between the Tx UE 104 and the Rx UE 106. In some embodiments, the gNodeB 102 is further configured to provide the sidelink data scheduling signal 116 to the Tx UE 104. In some embodiments, the gNodeB 102 is configured to determine the sidelink TCI state of the set of sidelink TCI states to be included within the sidelink data scheduling signal 116, based on information of a signal strength associated with the corresponding transmit beam associated with the sidelink TCI state.

Upon receiving the sidelink data scheduling signal 116 from the gNodeB 102, the Tx UE 104 is further configured to process the sidelink data scheduling signal 116 and provide a scheduled sidelink data transmission 118 to the Rx UE 106, by utilizing the transmit beam as indicated by the sidelink TCI state included within the sidelink data scheduling signal 116. In some embodiments, the gNodeB 102 is further configured to generate a sidelink receive scheduling signal 119 to be provided to the Rx UE 104. In some embodiments, the sidelink receive scheduling signal 119 comprises data scheduling information indicative of the resource allocation, modulation data scheme (MCS) etc. for the scheduled sidelink data transmission 118 from the Tx UE 104. In some embodiments, the sidelink receive scheduling signal 119 further comprises a sidelink TCI state indicative of a receive beam associated with the Rx UE 106 on which the sidelink data 118 transmitted from the Tx UE 104 is to be received. Upon receiving the sidelink receive scheduling signal 119, the Rx UE 106 is configured to process the sidelink receive scheduling signal 119 and determine the receive beam to receive a scheduled sidelink data transmission 118 from the Tx UE 104. In some embodiments, the Rx UE 106 is configured to receive the sidelink receive scheduling signal 119 from the Tx UE 104, instead of the gNodeB 102. In such embodiments, the Tx UE 104 is further configured to generate the sidelink receive scheduling signal 119 and provide the sidelink receive scheduling signal 119 to the Rx UE 106.

Figure 2:
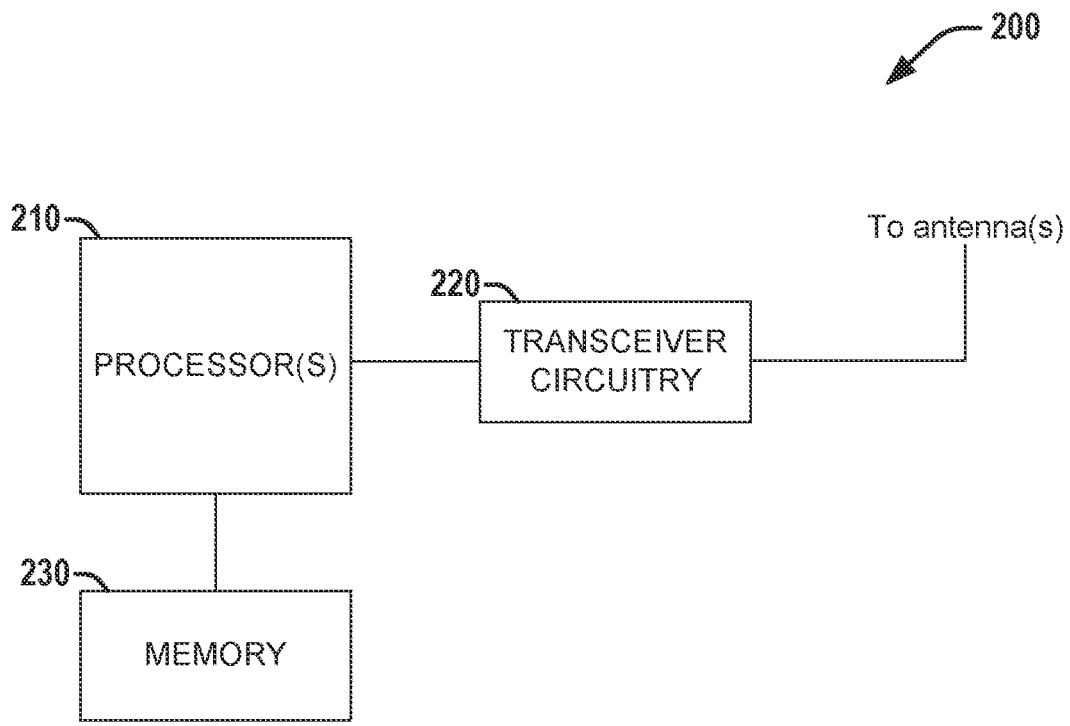
FIG. 2 illustrates a block diagram of an apparatus employable at a Base Station (BS), eNodeB, gNodeB or other network device that that facilitates network assisted beamforming for unicast sidelink communication, according to various aspects described herein.

Referring to FIG. 2, illustrated is a block diagram of an apparatus 200 employable at a Base Station (BS), eNodeB, gNodeB or other network device that facilitates network assisted beamforming for unicast sidelink communication, according to various aspects described herein. The apparatus 200 can include one or more processors 210 comprising processing circuitry and associated interface(s) (e.g., a radio frequency interface), communication circuitry 220, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 230 (which can comprise any of a variety of storage mediums and can store instructions and/or data associated with one or more of processor(s) 210 or communication circuitry 220). In various aspects, the apparatus 200 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 210, communication circuitry 220, and the memory 230 can be included in a single device, while in other aspects, they can be included in different devices, such as part of a distributed architecture. In some embodiments, the apparatus 200 could be included within the gNodeB 102 of FIG. 1.

Figure 3:
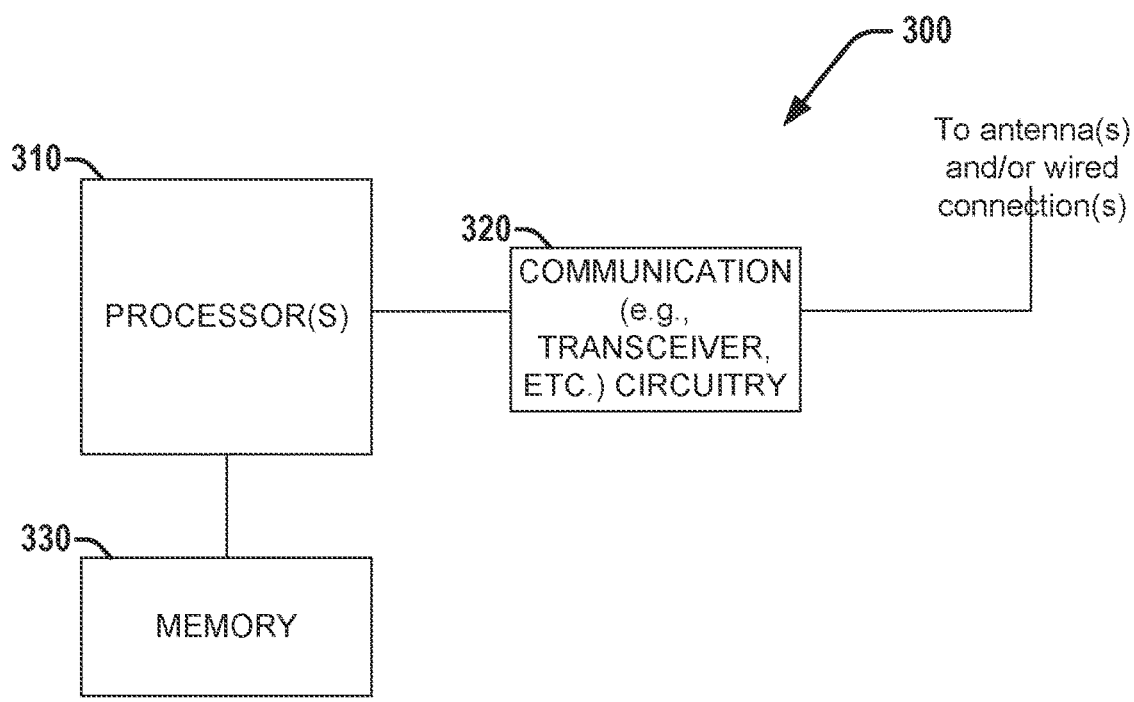
FIG. 3 illustrates a block diagram of an apparatus employable at a user equipment (UE) or other network device (e.g., IoT device) that facilitates to perform network assisted beamforming for unicast sidelink communication, according to various aspects described herein.

Referring to FIG. 3, illustrated is a block diagram of an apparatus 300 employable at a user equipment (UE) or other network device (e.g., IoT device) that facilitates to perform network assisted beamforming for unicast sidelink communication, according to various aspects described herein. Apparatus 300 can include one or more processors 310 comprising processing circuitry and associated interface(s) (e.g., radio frequency interface), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320). In various aspects, apparatus 300 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 310) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 310) can comprise one or more of: identifying physical resources associated with the signal/message, detecting the signal/message, resource element group deinterleaving, demodulation, descrambling, and/or decoding. In some embodiments, the apparatus 300 could be included within the UE 104 and the UE 106 of FIG. 1.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a gNodeB associated with a new radio (NR) system, comprising one or more processors configured to configure one or more sidelink sounding reference signals (SRS), for one or more user equipments (UEs) associated with the gNodeB, to be utilized by the one or more UEs for transmission or reception, or both, over sidelink; generate one or more sidelink SRS configuration signals to be provided, respectively, to the one or more UEs, wherein each sidelink SRS configuration signal comprises sidelink SRS configuration information on the one or more sidelink SRS configured for a respective UE; and a radio frequency (RF) interface, configured to provide, to a radio frequency (RF) circuitry, the one or more sidelink SRS configuration signals, for subsequent transmission to the one or more UEs, respectively.

Example 2 is an apparatus, including the subject matter of example 1, wherein the sidelink SRS configuration included within each sidelink SRS configuration signal of the one or more sidelink SRS configuration signals comprises one or more of a time-frequency resource parameter, an SRS type parameter, a sequence parameter, cyclic shift parameter, a periodicity parameter and an antenna port parameter associated with the one or more sidelink SRS configured for the respective UE.

Example 3 is an apparatus, including the subject matter of examples 1-2, including or omitting elements, wherein the one or more processors is further configured to generate a sidelink SRS scheduling signal to be provided to a first UE of the one or more UEs, forming a transmit (Tx) UE, in order to schedule transmission of a configured sidelink SRS of the one or more configured sidelink SRS for the Tx UE, that forms a scheduled sidelink SRS transmission, from the Tx UE; and provide the sidelink SRS scheduling signal to the Tx UE, via the RF circuitry.

Example 4 is an apparatus, including the subject matter of examples 1-3, including or omitting elements, wherein the one or more processors is further configured to generate a signal strength report scheduling signal to be provided to a second UE of the one or more UEs, forming a receive (Rx) UE, wherein the signal strength report scheduling signal comprises a request to the Rx UE to schedule a measurement of a signal strength of the scheduled sidelink SRS transmission from the Tx UE and to report the measured signal strength, to the gNodeB; and provide the signal strength report scheduling signal to the Rx UE, via the RF circuitry.

Example 5 is an apparatus, including the subject matter of examples 1-4, including or omitting elements, wherein the one or more processors is further configured to process a signal strength reporting signal, received from the Rx UE, in response to providing the signal strength report scheduling signal to the Rx UE, wherein the signal strength reporting signal comprises information on the measured signal strength associated with the scheduled sidelink SRS transmission from the Tx UE, at the Rx UE; and determine the measured signal strength associated with the scheduled sidelink SRS transmission from the TX UE, at the Rx UE, based thereon.

Example 6 is an apparatus, including the subject matter of examples 1-5, including or omitting elements, wherein the scheduled sidelink SRS transmission comprises a plurality of scheduled sidelink SRS transmissions, wherein each scheduled sidelink SRS transmission of the plurality of scheduled sidelink SRS transmissions is associated with a particular configured sidelink SRS of the one or more configured SRS for the Tx UE, and wherein the signal strength reporting signal comprises a plurality of signal strength reporting signals respectively associated with the plurality of the scheduled sidelink SRS transmissions.

Example 7 is an apparatus, including the subject matter of examples 1-6, including or omitting elements, wherein each configured SRS for the Tx UE is associated with a particular Tx beam associated with the Tx UE and wherein the measured signal strength associated with the scheduled sidelink SRS transmission comprised within the signal strength reporting signal is indicative of a signal strength associated with a respective Tx beam associated with the Tx UE.

Example 8 is an apparatus, including the subject matter of examples 1-7, including or omitting elements, wherein the one or more sidelink SRS configured for each UE of the one or more UEs is respectively associated with one or more transmit/receive beams associated with the respective UE, and wherein the one or more processors is further configured to configure a set of sidelink transmit configuration indicator (TCI) states for a set of UEs of the one or more UEs, wherein the set of sidelink TCI states is respectively associated with a set of configured sidelink SRS for a respective UE of the set of UEs, and wherein each sidelink TCI state of the set of sidelink TCI states is indicative of a transmit/receive beam associated with the respective configured sidelink SRS; and provide a set of TCI state configuration signals to the set of UEs, respectively, wherein each TCI state configuration signal comprises TCI configuration information on the set of sidelink TCI states configured for a respective UE of the set of UEs.

Example 9 is an apparatus, including the subject matter of examples 1-8, including or omitting elements, wherein the one or more processors is further configured to generate a sidelink data scheduling signal to be provided to a first UE of the set of UEs, forming a transmit (Tx) UE, in order to schedule a sidelink data transmission from the Tx UE to a second UE of the one or more UEs, forming a receive (Rx) UE, wherein the sidelink data scheduling signal comprises a sidelink TCI state of the set of sidelink TCI states configured for the Tx UE, wherein the sidelink TCI state is indicative of a transmit beam to be utilized by the Tx UE for the sidelink data transmission; and provide the sidelink data scheduling signal to the Tx UE, via the RF circuitry.

Example 10 is an apparatus, including the subject matter of examples 1-9, including or omitting elements, wherein the one or more processors is further configured to generate a sidelink receive scheduling signal comprising a sidelink TCI state of the set of sidelink TCI states configured for the Rx UE, to be provided to the Rx UE, in order to enable the Rx UE to determine an optimal receive beam to receive the scheduled sidelink data transmission from the Tx UE; and provide the sidelink receive scheduling signal to the Rx UE, via the RF circuitry.

Example 11 is an apparatus, including the subject matter of examples 1-10, including or omitting elements, wherein the set of sidelink TCI states configured for the Tx UE and the set of sidelink TCI states configured for the Rx UE are the same, for one transmission direction between the Tx UE and the Rx UE, and wherein each sidelink TCI state of the set of sidelink TCI states is indicative of a Tx beam associated with the Tx UE and an Rx beam associated with the Rx UE.

Example 12 is an apparatus, including the subject matter of examples 1-11, including or omitting elements, wherein the one or more processors is further configured to determine the sidelink TCI state to be provided within the sidelink data scheduling signal, based on information of a signal strength associated with the corresponding transmit beam associated with the sidelink TCI state.

Example 13 is an apparatus configured to be employed in a user equipment (UE) associated with a new radio (NR) system, comprising one or more processors configured to process a sidelink sounding reference signal (SRS) configuration signal, received from a gNodeB associated therewith, wherein the sidelink SRS configuration signal comprises sidelink SRS configuration information on one or more sidelink SRS configured for the UE for transmission or reception, or both, over sidelink; and determine the one or more sidelink SRS configured for the UE, based on processing the sidelink SRS configuration signal.

Example 14 is an apparatus, including the subject matter of example 13, wherein the one or more processors is further configured to process a sidelink SRS scheduling signal, received from the gNodeB, wherein the sidelink SRS scheduling signal comprises SRS scheduling information to be utilized by the UE to schedule transmission of a configured sidelink SRS of the one or more configured sidelink SRS, that forms a scheduled sidelink SRS transmission from the UE.

Example 15 is an apparatus, including the subject matter of examples 13-14, including or omitting elements, wherein the one or more processors is further configured to provide the scheduled sidelink SRS transmission to a radio frequency (RF) circuitry, for subsequent transmission to a further UE that forms a receive (Rx) UE, over the sidelink, based on processing the sidelink SRS scheduling signal.

Example 16 is an apparatus, including the subject matter of examples 13-15, including or omitting elements, wherein the scheduled sidelink SRS transmission comprises a plurality of scheduled sidelink SRS transmissions, wherein each scheduled sidelink SRS transmission of the plurality of scheduled sidelink SRS transmissions is associated with a particular configured sidelink SRS of the one or more configured SRS for the UE, and wherein the sidelink SRS scheduling signal comprises a plurality of sidelink SRS scheduling signals, respectively, associated with the plurality of scheduled sidelink SRS transmissions.

Example 17 is an apparatus, including the subject matter of examples 13-16, including or omitting elements, wherein the one or more processors is further configured to process a signal strength report scheduling signal, received from the gNodeB, wherein the signal strength report scheduling signal comprises a request to schedule a measurement of a signal strength of a scheduled sidelink SRS transmission from a further UE, that forms a Tx UE and to report the measured signal strength to the gNodeB; and measure the signal strength associated with the scheduled sidelink SRS transmission from the Tx UE, in response to processing the signal strength report scheduling signal.

Example 18 is an apparatus, including the subject matter of examples 13-17, including or omitting elements, wherein the one or more processors is further configured to generate a signal strength reporting signal, to be provided to the gNodeB, in response to processing the signal strength report scheduling signal, wherein the signal strength reporting signal comprises information on the measured signal strength associated with the scheduled sidelink SRS transmission from the Tx UE; and provide the signal strength reporting signal to the gNodeB, via the RF circuitry.

Example 19 is an apparatus, including the subject matter of examples 13-18, including or omitting elements, wherein the one or more processors is further configured to process a transmit configuration indicator (TCI) state configuration signal, received from the gNodeB, wherein the TCI configuration signal comprises TCI configuration information on a set of sidelink TCI states configured for the UE, wherein the set of sidelink TCI states is respectively associated with a set of configured sidelink SRS of the one or more sidelink SRS configured for the UE, and wherein each configured sidelink SRS of the set of configured sidelink SRS is associated with a respective transmit/receive beam associated with the UE; and determine the set of sidelink TCI states respectively associated with the set of configured sidelink SRS for the UE, based on processing the TCI configuration signal.

Example 20 is an apparatus, including the subject matter of examples 13-19, including or omitting elements, wherein the one or more processors is further configured to process a sidelink data scheduling signal, received from the gNodeB associated therewith, wherein the sidelink data scheduling signal comprises data scheduling information to be utilized by the UE to schedule a sidelink data transmission to a further UE, that forms a receive (Rx) UE, and wherein the sidelink data scheduling signal further comprises a sidelink TCI state from the set of sidelink TCI states configured for the UE, wherein the sidelink TCI state is indicative of a transmit beam to be utilized by the UE for the sidelink data transmission; and provide the sidelink data transmission, to the Rx UE, by utilizing the transmit beam as indicated by the sidelink TCI state, based on processing the sidelink data scheduling signal.

Example 21 is an apparatus, including the subject matter of examples 13-20, including or omitting elements, wherein, prior to providing the sidelink data transmission to the Rx UE, the one or more processors is further configured to provide a sidelink receive scheduling signal to the Rx UE, wherein the sidelink receive scheduling signal comprises a sidelink TCI state of a set of sidelink TCI states configured for the Rx UE, wherein the sidelink TCI state within the sidelink receive scheduling signal is indicative of a receive beam associated with the Rx UE on which the sidelink data transmitted from the Tx UE is to be received, thereby enabling the Rx UE to determine an optimal receive beam to receive the sidelink data transmission from the Tx UE.

Example 22 is an apparatus, including the subject matter of examples 13-21, including or omitting elements, wherein the one or more processors is further configured to process a sidelink receive scheduling signal, received from the gNodeB or from a further UE, that forms a transmit (Tx) UE, wherein the sidelink receive scheduling signal comprises a sidelink TCI state from the set of sidelink TCI states configured for the UE, wherein the sidelink TCI state is indicative of a receive beam associated with the UE on which a sidelink data transmitted from the Tx UE is to be received; and determine an optimal receive beam to receive the scheduled sidelink data transmission from the Tx UE, based thereon.

Example 23 is a computer readable storage device storing executable instructions that, in response to execution, cause one or more processors of a gNodeB to perform operations, the operations comprising configuring one or more sidelink sounding reference signals (SRS), for one or more user equipments (UEs) associated with the gNodeB, to be utilized by the one or more UEs for transmission or reception, or both, over sidelink; generating one or more sidelink SRS configuration signals to be provided, respectively, to the one or more UEs, wherein each sidelink SRS configuration signal comprises sidelink SRS configuration information on the one or more sidelink SRS configured for a respective UE; and providing the one or more sidelink SRS configuration signals to a radio frequency (RF) circuitry, for subsequent transmission to the one or more UEs, respectively.

Example 24 is a computer readable storage device, including the subject matter of example 23, wherein the one or more sidelink SRS configured for each UE of the one or more UEs is respectively associated with one or more transmit/receive beams associated with the respective UE, and wherein the operations further comprises configuring a set of sidelink transmit configuration indicator (TCI) states for a set of UEs of the one or more UEs, wherein the set of sidelink TCI states is respectively associated with a set of configured sidelink SRS for each UE of the set of UEs, and wherein each sidelink TCI state of the set of sidelink TCI states is indicative of a transmit/receive beam associated with the respective configured sidelink SRS.

Example 25 is a computer readable storage device, including the subject matter of examples 23-24, including or omitting elements, wherein the operations further comprises generating a sidelink data scheduling signal to be provided to a first UE of the set of UEs, forming a transmit (Tx) UE, in order to schedule a sidelink data transmission from the Tx UE to a second UE of the one or more UEs, forming a receive (Rx) UE, wherein the sidelink data scheduling signal comprises a sidelink TCI state of the set of sidelink TCI states configured for the Tx UE, wherein the sidelink TCI state is indicative of a transmit beam to be utilized by the Tx UE for the sidelink data transmission; and providing the sidelink data scheduling signal to the Tx UE, via the RF circuitry.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. A user equipment (UE), comprising:
    a memory configured to store instructions;
    radio front end circuitry; and
    one or more processors connected to the memory, and when executing the instructions stored in the memory, configured to:
        receive a transmit configuration indicator (TCI) configuration signal from a base station (BS), wherein the TCI configuration signal comprises TCI configuration information comprising one or more sidelink TCI states;
        generate sidelink data; and
        transmit, using the radio front end circuitry, the sidelink data to receiving UE using one or more transmit beams associated with the one or more sidelink TCI states.

2. The UE of claim 1, wherein a unicast transmission is used to transmit the sidelink data to the receiving UE.

3. The UE of claim 1, wherein the one or more TCI states are respectively associated with a set of configured sidelink reference signals for the UE.

4. The UE of claim 1, wherein the one or more processors are further configured to:
    receive a sounding reference signal (SRS) scheduling signal from the BS; and
    transmit a sidelink SRS to the receiving UE based on the SRS scheduling signal, wherein the sidelink SRS is transmitted on a transmit beam associated with a TCI state of the one or more TCI states.

5. The UE of claim 1, wherein the one or more processors are further configured to:
    receive a sidelink data scheduling signal from the BS to schedule the transmission of the sidelink data to the receiving UE, wherein the sidelink data scheduling signal comprises a sidelink TCI state of the one or more sidelink TCI states indicating a transmit beam to be used in the transmission.

6. The UE of claim 5, wherein the sidelink TCI state of the one or more sidelink TCI states is chosen based on a signal strength associated with the transmit beam indicated by the sidelink TCI state.

7. The UE of claim 5, wherein the one or more processors are further configured to:
    transmit a sidelink receive scheduling signal to the receiving UE for transmitting the sidelink data to the receiving UE, the sidelink receive scheduling signal comprising a sidelink TCI state indicating a receive beam associated with the receiving UE on which to receive the sidelink data.

8. The UE of claim 7, wherein the sidelink receive scheduling signal is generated by the UE.

9. A user equipment (UE), comprising:
    a memory configured to store instructions; and
    one or more processors connected to the memory, and when executing the instructions stored in the memory, configured to:

receive a transmit configuration indicator (TCI) configuration signal from a base station (BS), wherein the TCI configuration signal comprises TCI configuration information comprising one or more sidelink TCI states; and receive data from a transmitting UE using receive beams associated with the one or more sidelink TCI states.

10. The UE of claim 9, wherein the one or more processors are further configured to:

receive a sidelink SRS transmission;

generate a signal strength reporting signal comprising a signal strength associated with the sidelink SRS transmission; and transmit the signal strength reporting signal to the BS.

11. The UE of claim 9, wherein the one or more processors are further configured to:

receive a sidelink receive scheduling signal comprising a sidelink TCI state indicating a receive beam on which the data is to be received.

12. The UE of claim 11, wherein the sidelink TCI state is determined based on a measured signal strength associated with the receive beam indicated by the sidelink TCI state.

13. The UE of claim 11, wherein the sidelink receive scheduling signal is received from the BS.

14. The UE of claim 11, wherein the sidelink receive scheduling signal is received from the transmitting UE.

15. A base station (BS), comprising:

a memory configured to store instructions;

radio front end circuitry; and one or more processors connected to the memory, and when executing the instructions stored in the memory, configured to:

prepare one or more sidelink transmit configuration indicator (TCI) states for one or more user equipments (UEs);

generate a set of TCI configuration signals for a set of UEs of the one or more UEs, wherein the set of TCI configuration signals comprises the one or more sidelink TCI states for the set of UEs; and transmit, using the radio front end circuitry, a first TCI configuration signal of the set of TCI configuration signals to a first UE of the set of UEs, comprising first sidelink TCI states of the one or more sidelink TCI states indicative of transmit beams of the first UE.

16. The BS of claim 15, wherein the one or more processors are further configured to perform the instructions to transmit a second TCI configuration signal of the set of TCI configuration signals to a second UE of the set of UEs, comprising second sidelink TCI state indicative of receive beams of the second UE.

17. The BS of claim 16, wherein the first sidelink TCI states configured for the first UE is the same as the second sidelink TCI states configured for a second UE.

18. The BS of claim 15, wherein each TCI state configuration signal comprises sidelink TCI states configured for a respective UE of the set of UEs, and wherein each sidelink TCI state of the one or more sidelink TCI states is indicative of either a transmit beam or a receive beam of the respective UE of the set of UEs.

19. The BS of claim 18, wherein the set of sidelink TCI states is respectively associated with a set of configured sidelink sounding reference signal (SRS) resources for the respective UE.

20. The BS of claim 15, wherein the one or more processors are further configured to perform the instructions to:

generate a sidelink data scheduling signal to be provided to a first UE of the set of UEs, where the sidelink data scheduling signal is configured to schedule a sidelink unicast data transmission between the first UE and a second UE of the set of UEs; and transmit the sidelink data scheduling signal to the first UE.

* * * * *